April 11, 1961 A. A. SUNDBERG 2,978,901
DIRECT READING DYNAMOMETER
Filed June 1, 1956 4 Sheets-Sheet 1

INVENTOR.
ALFRED A. SUNDBERG
BY
*Herbert Smith*
ATTORNEY

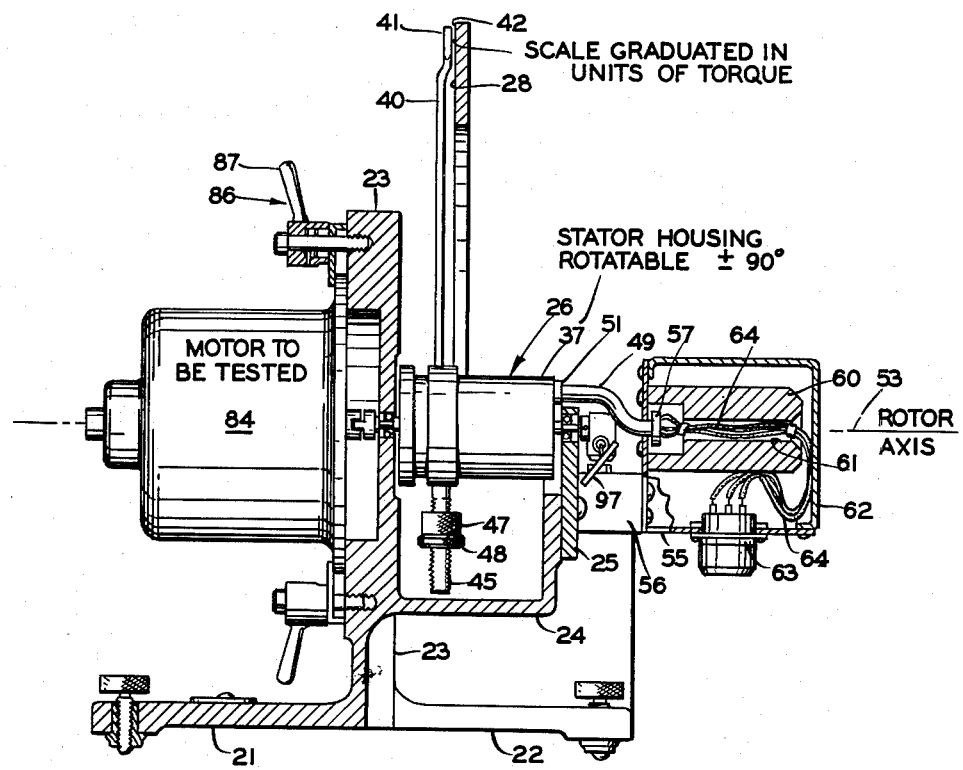
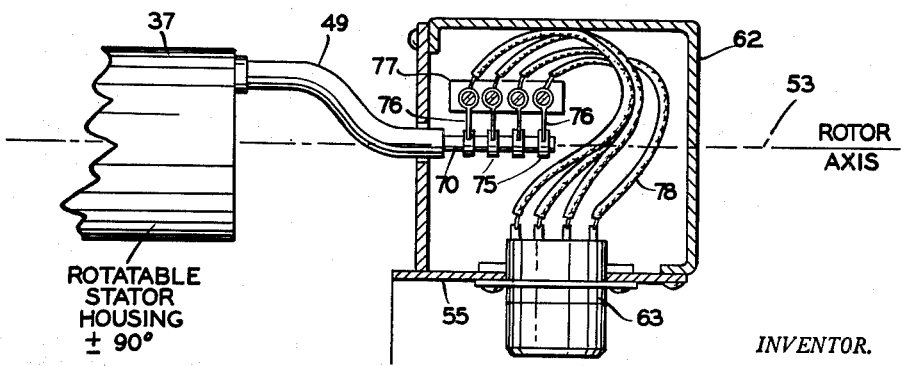

April 11, 1961     A. A. SUNDBERG     2,978,901
DIRECT READING DYNAMOMETER
Filed June 1, 1956     4 Sheets-Sheet 3
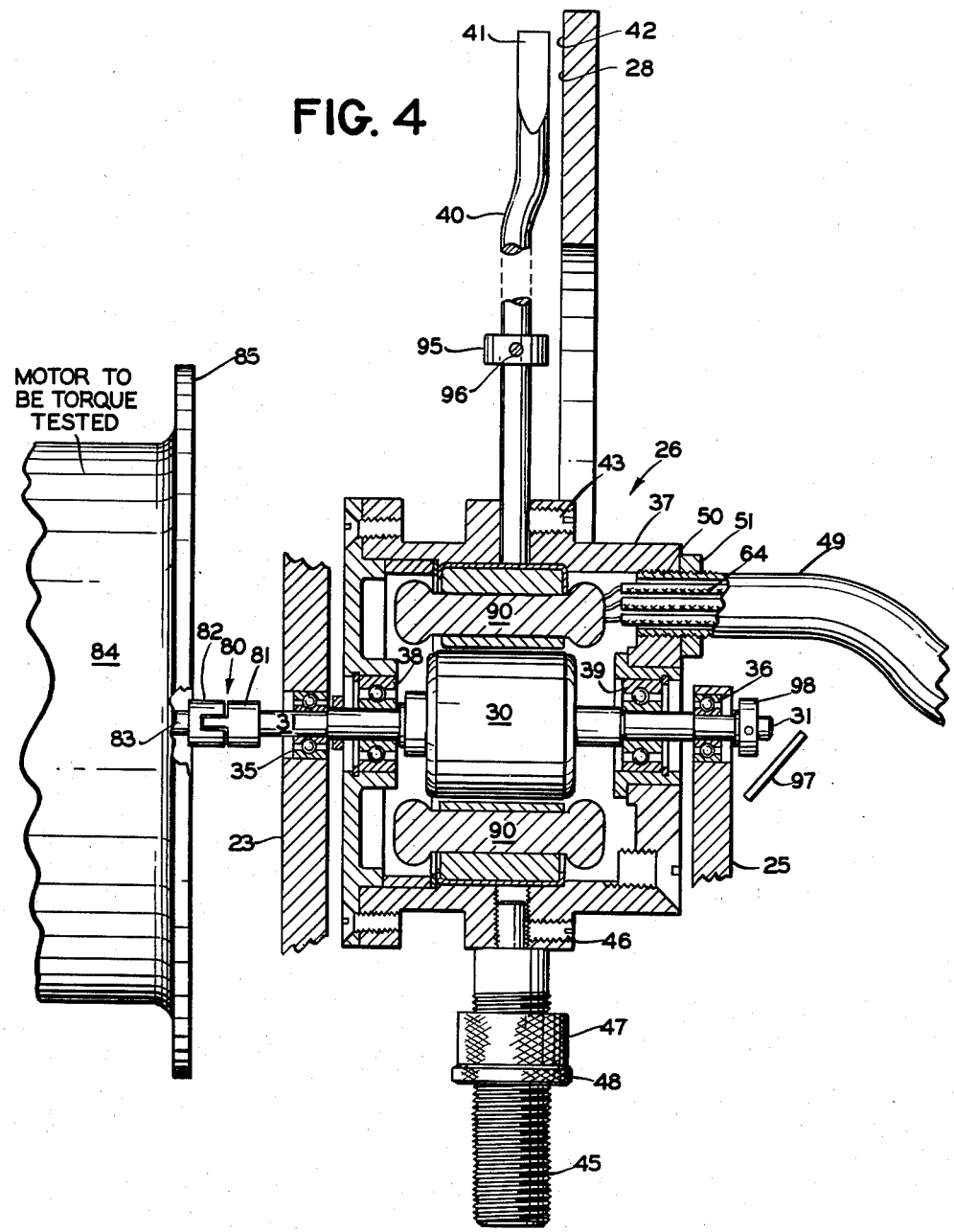
FIG. 4
INVENTOR.
ALFRED A. SUNDBERG
BY
ATTORNEY

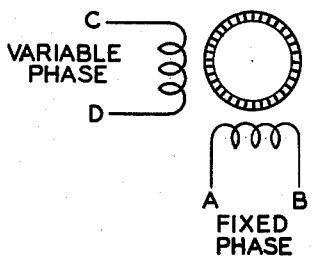
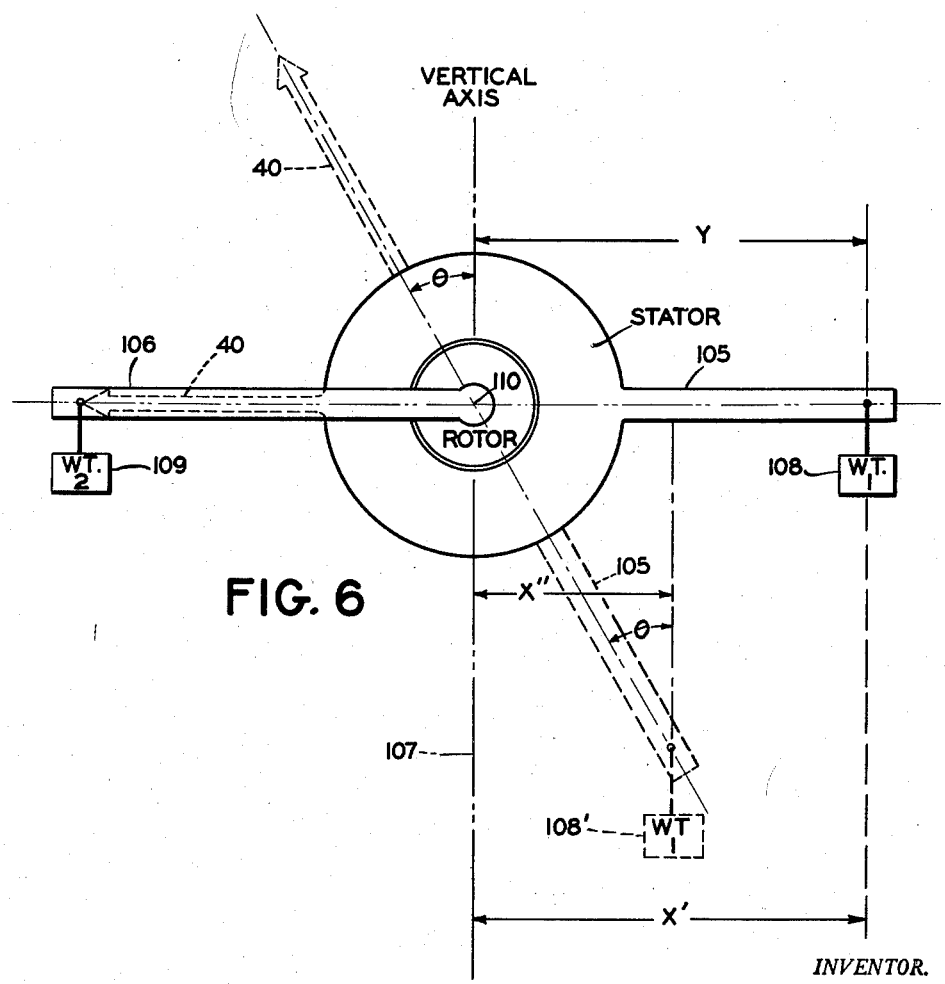

United States Patent Office 2,978,901
Patented Apr. 11, 1961

2,978,901
DIRECT READING DYNAMOMETER

Alfred A. Sundberg, Dumont, N.J., assignor to The Bendix Corporation, a corporation of Delaware Filed June 1, 1956, Ser. No. 588,873

1 Claim. (Cl. 73—136)

The present invention relates to dynamometers and more particularly to a direct reading torque measuring dynamometer readable directly in torque, and indicated in suitable units such as milligram-millimeters, gram-centimeters, ounce-inches, pound-feet, or ton-feet.

The device has a general application in measuring the torque of apparatus such as electrically operated motors and hydraulically operated motors, and is used in measuring the starting and running friction of motors. Also, the device may be used in measuring the starting or running friction of any device requiring a specific reading in torque, such as a nest of gears, or an arrangement of levers or linkages.

Heretofore, torque measuring devices generally employed adjustable lever arms, adjustable weights, combinations of gears and springs, linkage arrangements, and other mechanical combinations of elements which generally introduced a sizable friction error in the results obtained.

Further, conventional torque measuring devices frequently incorporated a metallic disc which was rotated by a motor through a magnetic field, which field imparted a brake drag or torque on the rotating disc which drag was measured on a suitable scale. The errors due to properly locating the drag disc and maintaining the relative parts in a desired relation to produce proper results also introduced undesirable errors in the results obtained.

An object of the present invetnion, therefore, is to provide a novel direct reading torque device capable of measuring starting torque, running torque and stall torque.

Another object is to provide a novel dynamometer employing a pair of relatively movable members with one of said members being rotatable and carrying a pointer movable over a scale graduated directly in units of torque.

The present invention contemplates a direct reading torque measuring dynamometer employing an induction motor having a rotor carried by a supporting structure and rotating within a stator which is movably mounted on the shaft of the rotor; the stator carrying an adjustable calibrating weight mounted 180 degrees from a pointer that is also carried by the stator and is movable over a scale calibrated in torque units.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings for illustration purposes only and are not to be construed as defining the limits of the invention.

In the drawings:

Fig. 2 is a partial sectional view taken along lines 2—2 of Fig. 1.

Fig. 3 is a modification of the means for connecting the conductors from a terminal to the dynamometer motor assembly.

Fig. 4 is an enlarged vertical sectional view of the dynamometer motor assembly.

Fig. 5 is a schematic diagram of a representative two-phase induction motor with terminals.

Fig. 6 is a view showing representative forces as applied to the device of the invention.

Figure 1:
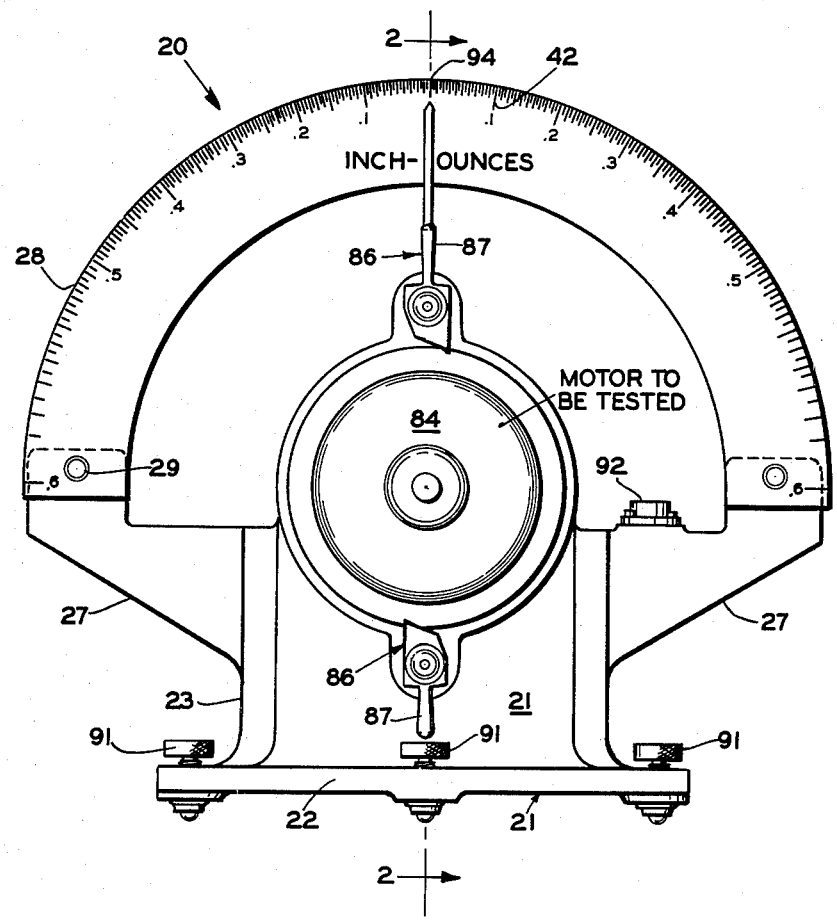
Fig. 1 is a front view of the device of the invention.

Referring to the drawings, there is shown a dynamometer 20 having a supporting structure 21 which includes a base portion 22 having a standard 23 disposed normal to said base and having a standard bracket 24 formed thereon with a bearing plate 25 secured to the standard bracket and having a portion positioned for rotatably supporting one end of a shaft of the dynamometer motor assembly 26. The standard 23 has a pair of arms 27 on either side thereof and has a graduated arcuate scale 28 secured to said pair of arms 27 by screws 29.

The dynamometer motor assembly 26 (Fig. 4) is shown in the enlarged view having the rotor 30 secured on a shaft 31 with said shaft being supported by bearing assemblies 35 and 36, which bearing assemblies are mounted respectively in the standard 23 and the bearing plate 25.

The dynamometer motor assembly 26 has a stator housing 37 which has bearing assemblies 38 and 39 journaled on hubs formed on the shaft 31. The stator housing is movable relative to the rotor shaft and the supporting structure, and the rotor is also movable in the supporting structure and relative to the stator housing.

The indicating pointer 40 has a pointer tip 41 which terminates in a knife edge and is disposed relative to the graduations such as 42 etched, marked or otherwise formed on the arcuate scale 28. The end of the pointer opposite the tip 41 is secured to the stator housing 37 by threadedly connecting the end thereof into the threaded opening in the stator housing, and said adjustable pointer is fastened therein by a set screw 43 or other means.

A calibrating weight arm 45 is threadedly connected on the stator housing 37. A calibrating weight 47 is movable radially on the calibrating weight arm and is locked in a predetermined position during calibration of the device by the jam nut 48.

A hollow movable conductor guide 49 has a reverse curve formed therein with one end of said conductor guide being secured to the stator housing 37 by a threaded portion 50 which has a jam nut 51 for positioning the movable conductor guide so that the lower end thereof is disposed to have a straight portion thereof axially aligned on the rotor axis 53 of the shaft 31. This arrangement reduces the turning arc of the conductors and the consequent mechanical resistance to rotation, or rotational, friction to a minimum.

A terminal bracket 55 is secured by screws to an arm 56 which may be carried by the bearing plate 25 or otherwise secured to the supporting structure. A guide shoulder 57 is secured on the lower end of the movable conductor guide 49 to keep out dust and foreign particles. A horizontal conductor guide 60 is secured to the terminal bracket 55, with said horizontal conductor guide having an axial opening 61 therein. A closure or convenient type cover 62 is secured to the bracket 55 to protect the horizontal conductor guide 60 and conductors. A female terminal 63 or header is secured to the terminal bracket 55 and has a multiplicity of flexible conductors 64 connected thereto with said conductors passing through the axial opening 61 and the hollow movable conductor guide 49 for connection with the coils in the stator housing 37 of the dynamometer motor assembly.

A modification of the means for connecting the windings of the stator housing with the terminal 63 or header 55 is shown in Fig. 3. In this modification the movable conductor guide 49 has the free end thereof with a tubular portion 70 secured thereto and being axially aligned with the rotor axis 53 of the rotor shaft 31. The conductors which are connected to the windings in the stator housing are independently connected to respective slip rings such as 75, with one slip ring being provided for each of the conductors. Brushes such as 76 as secured to an insulating strip 77 which strip is supported by the cover 62. Conductors such as 78 are connected from the brushes to the terminal 63 or header for connection of the conductors and motor windings with an outside source or sources of energy.

A mechanical coupling 80 is used for temporarily connecting the motor or apparatus to be torque tested with the rotor of the dynamometer and has a male portion 81 secured to the rotor shaft 31, and a female portion 82 which is removably attached or suitably fastened to the shaft 83 of a motor-to-be-tested 84, having a flange 85, which flange is clamp fastened to the standard 23 by conventional clamps 86 operated by properly rotating the handle 87.

In Fig. 4 the coils or windings 90 are shown connected to the flexible conductors such as 64.

Leveling screws 91, being three in number on the particular representation of the invention, are threadedly connected to the base 22 of the supporting structure 21 for properly leveling the device as indicated by the conventional circular level 92 secured on the supporting structure.

The stator housing 37 is free to rotate clockwise or counterclockwise 90 degrees from a zero center mark 94 on the calibrated dial 42. The stator housing rotates freely on its own precision bearings 38 and 39 on the rotor shaft 31, and is free to move completely independent of the stationary or moving rotor.

One form of dynamometer motor assembly which is represented herein is a low inertia type two-phase motor and functions similar to a conventional two-phase induction motor with the exception that both the rotor and the so-called stator are free to move in the motor assembly of the invention.

The pointer 40 has a static balancing weight 95 secured on the pointer by a screw 96 so that the said balancing weight may be positionable for setting and calibrating the device of the invention. The stator housing in construction will have portions thereof cut away and other weights added in a conventional balancing process to provide a stator housing per se, which is perfectly balanced on the rotor shaft.

Fig. 5 is a schematic representation of a two-phase induction motor of the type which may be used with the present invention.

In operation, the winding between the terminals A and B may be regarded as the fixed phase winding which may be energized by an alternating current of a predetermined frequency, let us say of 400 cycles, and the winding connected across the terminals C and D may be regarded as the variable phase winding of the motor. The voltage to the terminals A and B should be 90 degrees out of phase with the voltage connected to the terminals C and D. The voltage connected to one set of terminals may be either leading or lagging. The voltage connected to the other set of terminals, and a single source of voltage may be used with a phase shift circuit or network to provide the voltage with a 90 degree lag or lead.

The dynamometer motor, however, could be a suitable direct current motor if the conventional commutator had very low friction and the bearings also had the requisite low friction loss for mounting the rotor and stator relative to the supporting structure.

During operation, in order to determine whether or not the rotor is moving, a mirror assembly 97 is mounted on the supporting structure and having the mirror portion disposed relative to a white dot formed on the surface of a disc 98 axially mounted on the end of the rotor shaft 31. By this arrangement a stroboscope may be used and an operator may look into the mirror assembly 97 from above and determine the relative movement of the motor assembly rotor by observing the white dot formed on the disc 98.

Fig. 6 is a representative showing of the forces and torque arm arrangement effecting calibration and operation of the device.

The calibrating weight 47 and the jam nut 48 are moved to the desired position on the calibrating arm 45 during the calibrating process.

The length of the torque arm can be made to vary from zero, when the weight arm and pointer are vertical represented by the zero axis or vertical axis line 107, to a length equal to Y, when the torque arm is in a horizontal position, shown by the representative position 105 of the torque arm. The representative position 105 is shown when the torque arm is horizontal or 90 degrees from the vertical axis 107. Since the weight is constant, a varying force or torque can be computed from zero to almost infinity in any increment of torque measure in ounce-inches, pound-feet, gram-centimeters, milligram-millimeters, ton-feet, and the like. These increments of torque can be precisely engraved on the scale 42 and, therefore, provide a direct reading of the amount of torque required to rotate calibrating weight such as 47 and 48 attached to any length torque arm 45, over an arc of 90 degrees of rotation.

Fig. 6 shows by conventional symbols that the method of balancing one force or torque against the other is used as in ordinary balancing scales except that the calibrated balancing force or torque has an inherent variable torque arm that varies as the sine of the angle $\theta$, where theta ($\theta$) equals the angle between the vertical axis represented by line 107 and the axis of the torque arm. The variable torque arm which is mounted on the stator is coupled to the applied force torque arm which is mounted on the rotor, entirely by magnetic force that is introduced between the rotor and the stator. The friction in the bearings has been reduced to such a negligible amount that the error therefrom is also negligible so that essentially all the coupling is due to magnetic force. Therefore, the scale can be calibrated from the mathematical computations involved in converting the angle $\theta$ to equal a point on the scale equal to any required amount of torque. The accuracy and stability of this method of measurement and calibration, therefore, can be held to as close a tolerance as the engraving and assembly operations involved in manufacturing will permit. The accuracy of the measurement is not affected by instability and non-linearity that normally would result when springs are used as the counteracting force.

There has been provided means for easy initial calibration and maintenance of calibration by replacing the applied torque arm and weight by an exact, accurately known length of torque arm, and by an exact, accurately known amount of weight, against which the reading obtained on the accurately calibrated scale is corrected or checked. When electrical power is applied to the stator windings, the resulting magnetic reaction mentioned heretofore produces the magnetic force between the rotor and the stator. The amount of electrical power applied must be sufficient to lift the exact accurately known length of torque arm with weight attached so that this torque arm is exactly 90 degrees perpendicular to the vertical axis of the device. The amount of correction can be easily obtained by adjusting the weight 47 and jam nut 48, and arm 45 until the reading is correct.

A considerable reduction in torque due to flexing of the conductors 64 has been provided by guiding the conductors through guides 49 and 60 so that they are centered at the axis of rotation of the motor assembly. This method of electrical connection produces a desirable reduction in torque which is also directly proportional with the scale reading, i.e., torque due to flexing of conductors is very small around readings near zero torque and proportionately higher near the higher torque readings on the scale.

The calibrations in degrees obtained for any torque range having the same ratio of torque between zero degrees and 90 degrees on the torque scale can be used for other ranges by merely changing the scale of magnitude of torque for different ranges through the use of a replaceable scale with only the magnitude of torque engraved or marked thereon.

The weight consisting of calibrating weight 47, jam nut 48, and the calibrating weight arm 45 can be replaced by equivalent coiled balance springs in applications where the device must be used where the present vertical pointer must read in a horizontal plane.

The block 108 shown by legend WT1 represents the calibrating weight in toto, 47 and 48 when it is at its calibrated position and the torque arm is in the representative position 105. At this condition the block 109 which is shown by legend to be WT2 is located on the standard torque arm 106 which, for purposes of illustration, can be regarded as being weightless in itself or its weight balanced out by an equal length of arm 180 degrees in opposition, as shown in Fig. 6. Block WT1 is the calibrated weight and block WT2 is the "standard" or precision weight.

For the purpose of calibrating the device, the standard torque arm 106, which is a precision machined metal test bar, is secured to the rotor shaft 31 represented at axis 110 of the rotor. A standard precision weight 109 represented by the block having legend WT2 is fastened on the torque arm 106 in a precision hole at a predetermined position which is a precise known distance from the axis 110. At the condition shown in Fig. 6 when the representative arm 105 is axially aligned with the standard torque arm 106, the pointer 40 is also shown dotted (behind 106) axially aligned with members 105 and 106, which condition represents a maximum torque reading. One intermediate value of torque is shown by the pointer 40 having angle theta ($\theta$). When the representative position 105 is moved clockwise to the position shown dotted in Fig. 6, it will be noted that the pointer at angle theta ($\theta$) will indicate some intermediate value of torque between zero and maximum. At this later position the actual length of this torque arm will be the representative distance shown by arrow X whereas the arrow Y is the actual length of the arm 105 when it is in its maximum torque position shown by the solid line.

In operation, the motor to be tested is coupled by means of the coupling means to the shaft of the rotor of the dynamometer motor assembly. Normally, all manufacturers of motors specify that the particular motor will produce a certain torque when a specified voltage and current is applied. The motor under test, having already been coupled to the dynamometer motor assembly, has applied thereto its manufacturer's specified voltage and current. In the beginning of the test, there is no voltage applied to the dynamometer motor. Therefore, the motor under test will be rotating the rotor of dynamometer, but since the friction of the dynamometer motor is substantially zero, the pointer of the dynamometer would show zero torque of the motor to be tested at the no load condition. In order to provide a load for the motor to be tested, the dynamometer has a voltage applied thereto which creates a magnetic field in which the rotor of the dynamometer will be rotated by the motor to be tested. The more voltage which is applied to the dynamometer will increase the magnetic field accordingly. As the magnetic field is increased in the dynamometer, naturally there is more opposition to the rotation of the rotor of the dynamometer and accordingly there is a greater retardation of rotation of the shaft of the motor to have been tested. The magnetic field of the dynamometer produces a magnetic force which opposes the rotative force of the motor under test, the characteristics of the magnetic force being determined by the manner, polarity, or otherwise in which the voltage source is applied to the dynamometer.

The reaction of the opposing forces causes the stator of the dynamometer to rotate in one direction or the other, and indicate the torque of the motor under test directly on the calibrated scale by the pointer which is attached to the stator. The movement of the stator and pointer requires enough force from the motor under test to lift the calibrating weight on its calibrating arm, which arm and its weight are also attached to the stator.

In order to obtain the stall torque of a particular motor, the specified voltage and current of the particular motor is applied to the motor and the motor will run at no load, when the dynamometer is not energized. Thereafter the windings of the dynamometer are energized so as to oppose the rotation of the motor under test. The voltage to the dynamometer is then increased until the rotor of the motor and the rotor of the dynamometer which are mechanically coupled together come to a full stop. At this condition, the stator of the dynamometer would be rotated in one direction or the other. The exact position of the pointer 40 in relation to the calibrations on the torque scale 28 would show the exact stall torque of the particular motor under test. If the torque scale is graduated in ounce-inches, and the knife edge 41 of the pointer 40 should stop over a graduation of 39, let us say, then the stall torque of the particular motor would be 39 ounce-inches. To obtain a particular running torque, after the specified voltage and current is applied to the motor, a stroboscope is used to observe the speed of the dynamometer rotor by checking the small white dot on the stroboscope disc element, which stroboscope disc 98 on shaft 31, rotates in front of the mirror 97. The voltage to the dynamometer windings is increased, and by the use of the stroboscope, the speed of the dynamometer rotor is then observed until the revolutions per minute specified by the manufacturer is obtained. At this particular running speed of the motor under test, and with the dynamometer suitably energized to obtain speed, the dynamometer stator will have been caused to rotate a certain amount resulting in an angle $\theta$ being produced between the longitudinal axis of the pointer and the vertical axis of the dynamometer. This angle $\theta$ will find the pointer located over a specific graduation on the calibrated dial to indicate the exact ounce-inches of torque for the particular running speed of the particular motor.

From the foregoing, it will be seen that the present device will read the torque of any specified load speed, and will also read the stall torque of any particular device whether it be any form of motor, gear train or other arrangements having a rotative output.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

A torque indicator for a device to be tested, comprising a motor including a casing, a rotor, means rotatably supporting the rotor in the casing, other means rotatably supporting the casing, electromagnetic means carried by the casing and cooperating with the rotor to drive the same, and said rotor including coupling means to connect the rotor to the device to be tested, an indicator arm projecting from said casing, means including pendulous weight means projecting from the casing for yieldingly biasing said casing to a null position, and said said indicator arm adapted to be moved by said motor a distance corresponding to the torque of said device to be tested, electrical conductor means associated with said motor to supply electrical energy to said electromagnetic means, said electrical means including flexible electrical conductors external to said motor and connected therewith, guide means for said conductors, one end of said guide means being secured to said casing and an opposite end portion of said guide means extending longitudinally in axial alignment with the axis of the rotor, slip rings carried by said end portion of the guide means and connected to said electrical conductors, and slidable brushes cooperating with said slip rings so as to connect said electrical conductors to a source of electrical energy.

References Cited in the file of this patent

UNITED STATES PATENTS

| | | |
|---|---|---|
| 2,198,023 | Bode et al. | Apr. 23, 1940 |
| 2,445,095 | Winther | July 13, 1948 |
| 2,493,758 | Friedrich | Jan. 10, 1950 |
| 2,568,406 | Packer | Sept. 18, 1951 |
| 2,642,740 | Stephenson | June 23, 1953 |
| 2,736,196 | Knowles | Feb. 28, 1956 |
| 2,759,355 | Boyle | Aug. 21, 1956 |

FOREIGN PATENTS

| | | |
|---|---|---|
| 592,743 | Great Britain | Sept. 26, 1947 |
| 468,839 | Germany | Dec. 1, 1928 |